(12) United States Patent
Assenmacher

(10) Patent No.: US 10,204,031 B2
(45) Date of Patent: *Feb. 12, 2019

(54) METHODS AND SYSTEM TO CREATE APPLICATIONS AND DISTRIBUTE APPLICATIONS TO A REMOTE DEVICE

(71) Applicant: BlackBerry Limited, Waterloo (CA)

(72) Inventor: Holger Assenmacher, Eulenbis (DE)

(73) Assignee: BlackBerry Limited, Waterloo, Ontario (CA)

( * ) Notice: Subject to any disclaimer, the term of this patent is extended or adjusted under 35 U.S.C. 154(b) by 95 days.

This patent is subject to a terminal disclaimer.

(21) Appl. No.: 15/249,656

(22) Filed: Aug. 29, 2016

(65) Prior Publication Data

US 2017/0052878 A1 Feb. 23, 2017

Related U.S. Application Data

(63) Continuation of application No. 12/032,093, filed on Feb. 15, 2008, now Pat. No. 9,451,009.

(60) Provisional application No. 60/890,502, filed on Feb. 19, 2007.

(51) Int. Cl.
| | |
|---|---|
| *G06F 9/44* | (2018.01) |
| *G06F 9/45* | (2006.01) |
| *G06F 11/36* | (2006.01) |
| *H04L 29/06* | (2006.01) |
| *H04L 29/08* | (2006.01) |

(52) U.S. Cl.
CPC ......... *G06F 11/3664* (2013.01); *H04L 29/06* (2013.01); *H04L 67/02* (2013.01); *H04L 67/025* (2013.01); *H04L 67/34* (2013.01)

(58) Field of Classification Search
CPC ...... G06F 11/3664; H04L 29/06; H04L 67/02; H04L 67/025; H04L 67/34
See application file for complete search history.

(56) References Cited

U.S. PATENT DOCUMENTS

| | | | |
|---|---|---|---|
| 6,618,854 B1 * | 9/2003 | Mann | G06F 11/3664 714/E11.21 |
| 6,782,412 B2 * | 8/2004 | Brophy | H04L 29/06027 379/202.01 |
| 7,086,009 B2 * | 8/2006 | Resnick | G06F 8/20 700/96 |
| 7,121,468 B2 | 10/2006 | Schmidt et al. | |
| 7,451,403 B1 * | 11/2008 | Srinivasan | G06F 8/10 715/762 |

(Continued)

OTHER PUBLICATIONS

Dongping Huang, Software and Simulation Modeling for Real-time Software-intensive System, 2005, pp. 1-8. http://acims.asu.edu/wp-content/uploads/2012/02/Software-and-Simulation-Modeling-for-Real-time-Software-intensive-System.pdf (Year: 2005).*

(Continued)

*Primary Examiner* — Mongbao Nguyen
(74) *Attorney, Agent, or Firm* — Fish & Richardson P.C.

(57) ABSTRACT

A remotely accessible integrated development environment, and a sub-system for deploying applications to a remote device is disclosed. The sub-system may further comprise a rendering engine which is configured based upon a platform of the remote device, wherein the rendering engine is configured to communicate with, and receive applications from, a remotely accessible application server.

20 Claims, 4 Drawing Sheets

(56) References Cited

U.S. PATENT DOCUMENTS

| | | | | |
|---|---|---|---|---|
| 7,458,062 B2* | 11/2008 | Coulthard | ............... | G06F 8/24 717/108 |
| 7,464,368 B2* | 12/2008 | Kothari | ............... | G06F 8/30 715/234 |
| 7,584,239 B1* | 9/2009 | Yan | ............... | G06F 9/5027 709/201 |
| 8,689,174 B2* | 4/2014 | Shaburov | ............... | G06F 8/34 717/105 |
| 2002/0184610 A1 | 12/2002 | Chong et al. | | |
| 2002/0188434 A1 | 12/2002 | Shulman et al. | | |
| 2003/0105887 A1* | 6/2003 | Cox | ............... | G06F 8/20 719/328 |
| 2003/0163517 A1 | 8/2003 | Assaf et al. | | |
| 2003/0181196 A1 | 9/2003 | Davidov et al. | | |
| 2003/0217166 A1 | 11/2003 | Dal Canto et al. | | |
| 2004/0003371 A1* | 1/2004 | Coulthard | ............... | G06F 8/24 717/101 |
| 2004/0158811 A1 | 8/2004 | Guthrie et al. | | |
| 2004/0183827 A1 | 9/2004 | Putterman et al. | | |
| 2005/0050159 A1 | 3/2005 | Suraski | | |
| 2005/0097508 A1 | 5/2005 | Jacovi | | |
| 2005/0114475 A1 | 5/2005 | Chang | | |
| 2005/0223363 A1 | 10/2005 | Black-Ziegelbein et al. | | |
| 2005/0262075 A1 | 11/2005 | Beartusk | | |
| 2005/0262480 A1* | 11/2005 | Pik | ............... | G06F 8/20 717/120 |
| 2005/0262488 A1 | 11/2005 | Wagner et al. | | |
| 2006/0041856 A1* | 2/2006 | Holloway | ............... | G06F 8/20 717/101 |
| 2006/0112397 A1 | 5/2006 | Raghunandan et al. | | |
| 2006/0129972 A1* | 6/2006 | Tyburski | ............... | G06F 8/61 717/106 |
| 2006/0195818 A1 | 8/2006 | Berg et al. | | |
| 2006/0206856 A1 | 9/2006 | Breeden et al. | | |
| 2006/0294526 A1* | 12/2006 | Hambrick | ............... | G06F 8/20 719/315 |
| 2007/0061782 A1* | 3/2007 | Schreiner | ............... | G06F 8/71 717/124 |
| 2007/0099658 A1 | 5/2007 | Borquez et al. | | |
| 2007/0220494 A1 | 9/2007 | Spooner | | |
| 2008/0046557 A1 | 2/2008 | Cheng | | |
| 2008/0127036 A1 | 5/2008 | Kadur et al. | | |
| 2008/0127054 A1* | 5/2008 | Stubbs | ............... | G06F 8/20 717/106 |
| 2008/0127217 A1 | 5/2008 | Wang | | |
| 2008/0134298 A1* | 6/2008 | Nathan | ............... | G06F 8/20 726/4 |
| 2008/0163162 A1* | 7/2008 | Shaburov | ............... | G06F 8/34 717/105 |
| 2008/0163266 A1* | 7/2008 | Schmidt | ............... | G06F 8/71 719/328 |

OTHER PUBLICATIONS

Thomas C. Hudson, Managing Collaboration in the nanoManipulator, 2003, pp. 1-8. https://ieeexplore.ieee.org/stamp/stamp.jsp?tp=&arnumber=1191137 (Year: 2003).*

Danny Soroker, Pegboard: A Framework for developing mobile applications, 2006, pp. 1-13. https://www.usenix.org/legacy/events/mobisys06/full_papers/p138-soroker.pdf (Year: 2006).*

Donny Kurniawan, Worqbench: an Integrated Framework for e-Science Application Development, 2006, pp. 1-8. https://ieeexplore.ieee.org/stamp/stamp.jsp?tp=&arnumber=4031024 (Year: 2006).*

Wei-Meng Lee, Writing Cross-Platform Mobile Applications Using Crossfire, Jul. 12, 2014.

International Search Report and Written Opinion for corresponding PCT Application No. PCT/US08/54097 dated Jul. 22, 2008.

code.google.com' [online], "Google Mashup Editor—Mashup Framework and Tools," available on or before Jun. 2, 2007, via Internet Archive: Wayback Machine URL <https://web.archive.org/web/20070602114140/http://code.google.com/gme/>, [retrieved on Apr. 23, 2018], retrieved from URL <http://code.google.com/gme/>, 2 pages.

* cited by examiner

METHODS AND SYSTEM TO CREATE APPLICATIONS AND DISTRIBUTE APPLICATIONS TO A REMOTE DEVICE

CROSS REFERENCES TO RELATED APPLICATIONS

This application is a continuation of U.S. Non-Provisional patent application Ser. No. 12/032,093, entitled "Methods and System to Create Applications and Distribute Applications to a Remote Device", filed Feb. 15, 2008, which claims priority to U.S. Provisional Patent Application Ser. No. 60/890,502, entitled "Method and System to Design, Create, Manage, Find, and Distribute Applications for Multiple Devices using a Web Browser," filed Feb. 19, 2007, the disclosure of which is hereby incorporated by reference in its entirety.

FIELD OF INVENTION

The invention generally relates to distributing an application to a remote device, and more particularly, to developing applications on a server via a web browser and sending the applications to a remote device having a rendering engine.

BACKGROUND OF THE INVENTION

The design and development of computer applications typically includes a set of other programs such as text editors, language compilers, user interface layout programs, an operating system, and various other tools. Prior to application development, such programs are installed and configured on a computer accessible to the developer, and in most cases, such programs are installed on a local computer workstation. The application developer usually has knowledge of the programming language, the handling of the development tools, the remote device's operating system, and available application programming interfaces. The application developer also typically has systems and tools for debugging applications. When ready for deployment, the application developer uses the tools and methods for distributing the finished application to remote devices.

A need exists for a remotely accessible integrated development environment for application development. Moreover, a need exists for debugging and testing systems that are remotely accessible. A need also exists for deployment methods and systems that can deploy applications to various remote devices.

SUMMARY OF THE INVENTION

According to various aspects and in various embodiments, the present invention relates to a system which includes a remotely accessible integrated development environment comprising a remotely accessible application server configured to communicate with a web browser, wherein the remotely accessible application server is configured to communicate with a sub-system for deploying applications to a remote device. The sub-system may further comprise a rendering engine, the application server may further comprise a debugging environment and the remote device may further comprise a cellular phone.

The present invention may also include a system for executing applications on a remote device comprising a rendering engine configured based upon a platform of the remote device, wherein the rendering engine is configured to communicate with, and receive applications from, a remotely accessible application server.

In another embodiment, the present invention includes a method of using a remote device comprising receiving an application from a sub-system for deploying applications to the remote device, wherein the application was created by a remotely accessible integrated development environment and, executing the application on the remote device. The method may further comprise downloading an application via the world wide web.

In another embodiment, the present invention includes a method for sending an application to a remote device by selecting an application from a predefined list of applications on a webpage and/or submitting code for the application on a webpage, then sending the application to the remote device. The method may further comprise receiving a modification to the application and saving the alteration to the application on a computer readable medium.

DETAILED DESCRIPTION

Figure 1:
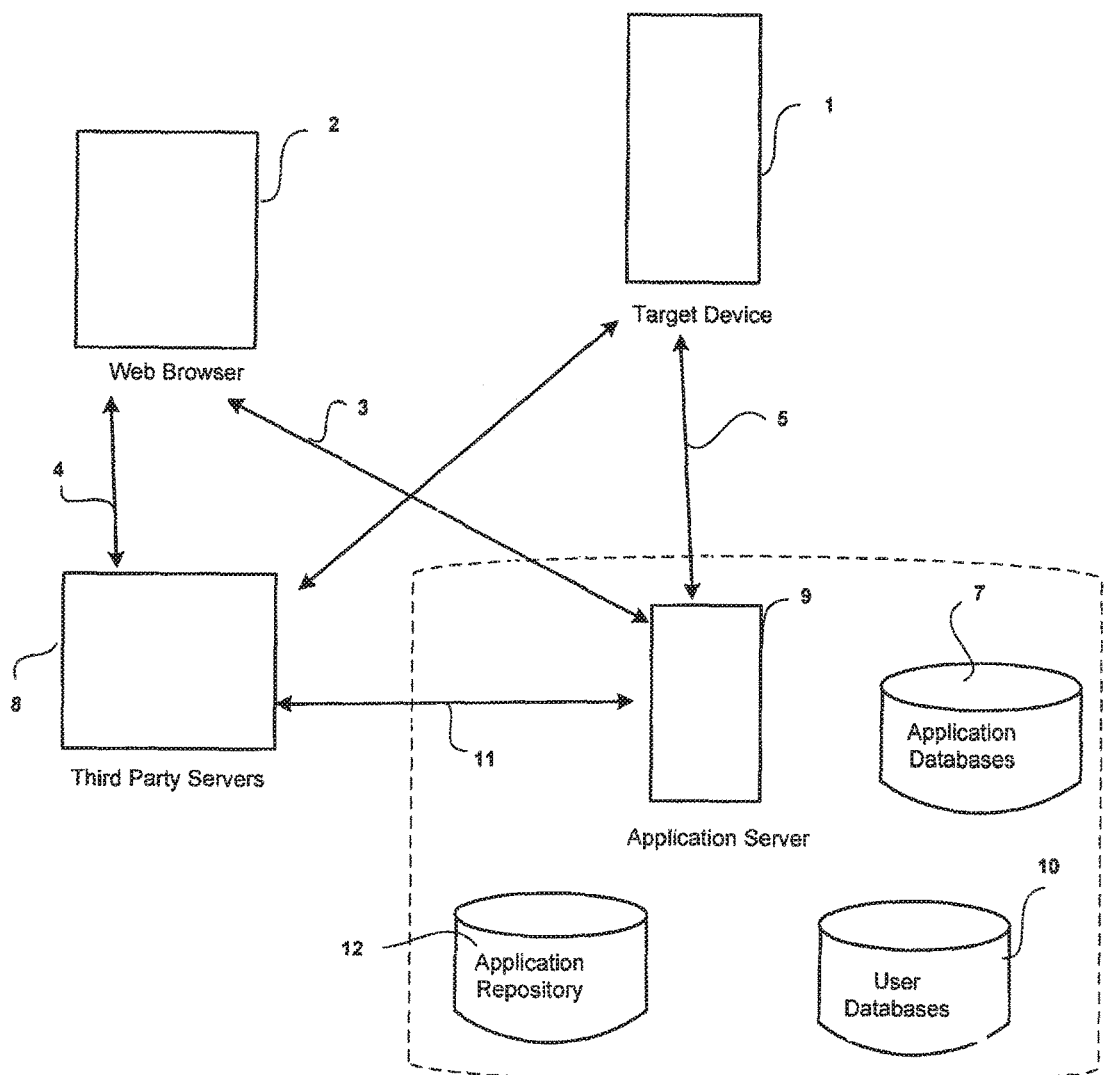
FIG. 1 is an exemplary system diagram, in accordance with one embodiment of the present invention.

In general, the system includes a remotely accessible integrated development environment for application development, deployment, debugging and/or management. In one embodiment, the application is designed and created by using a graphical user interface without necessarily employing a textual programming language and knowledge of such language. For immediate feedback and for debugging purposes, the current state of the application is optionally reflected simultaneously in the Web browser. The need for the installation of tools and the knowledge of their handling is significantly reduced or eliminated. A user may deploy an application with ease. According to various aspects of the present invention, the application to be deployed is translated for the selected remote device and either pushed or pulled to the remote device. The knowledge of remote devices, their operating system, and runtime environment is embodied in the system, so the need for such skills are minimized or eliminated. As such, the invention enables a larger number of users to create applications which are sent to a remote device.

A remote device may include any software and/or hardware suitably configured to receive an application. Exemplary remote devices include personal digital assistants, transponders, radio devices, mobile phones, cellular phones, personal computers, music players, video players, gaming consoles, web pages in browsers, proprietary media technologies, animation player technologies, in-car navigational systems, commercial advertising panels, and/or television sets.

Applications, as used herein, include any set of computing instructions. Applications instruct an electronic device to perform specified functions. Applications typically contain logic and methods for accessing, manipulating, and storing data. Examples of applications include word processors, web browsers, email clients, games (e.g., chess games, etc), and media players. Applications may contain instructions on displaying and formatting data. For example, an application may instruct an electronic device to access certain data and display it in a specified format and/or at a specified time.

Applications may be transported via any method suitable for such purpose. For example, the applications may be downloaded to the remote device via a Web browser or may be transported to the device using a "push" type operation via a network protocol over a cable or wireless infrastructure. Possible means for pushing an application or application reference include, but are not limited to, email, embedding in a Web page, part of an RSS feed, a WAP™ push, or a Bluetooth™ transmission. The system for deploying applications to remote devices may optionally include a runtime environment for the application. A runtime environment is software that allows a remote device to execute application code.

The method and system allows application development within a Web browser without installation (or minimal installation) of any local programming software and with minimal or no knowledge of a programming language. The application is designed, created, and/or maintained by using a graphical user interface within the Web browser. The application can also be used and verified in a simulated target environment in the Web browser while developing the application. In one embodiment, the application is stored together with its informal textual description in an application repository where the application may be searched for and optionally shared or manipulated by all or a subset of all users of the system. The application is stored in a device-independent form such that it may be run on any supported remote device, including some that do not exist at the time of creating the application. The application is translated (e.g., upon selection of an instruction key) for the selected target environment or remote device, downloaded, and executed. Applications may be either downloaded by the Web browser or transferred to the device using, e.g., a wired or wireless connection or can be downloaded and installed by the device itself The present invention enables a user to design, create, manage, find, and/or distribute applications for multiple devices using a Web browser. Local installation of tools or of a development or execution environment is not necessary. In this regard, the description that follows sets forth various exemplary embodiments of the invention only, and is not intended to limit the scope, applicability, or configuration of the invention in any way. Rather, the following description is intended to provide convenient illustrations for implementing different embodiments of the invention. As will become apparent, various changes may be made in the function and arrangement of the elements described in these embodiments without departing from the spirit and scope of the invention. For example, changes may be made in the design and arrangement of the elements described in the preferred embodiments without departing from the scope of the invention as set forth in the appended claims.

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, 95/98/2000, XP, Vista, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

As used herein, the term "network" includes any electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates its use over any network having similar functionality described herein. Various components of the present invention need not be in constant communication with a network but, in various embodiments, may only transiently be connected to a network.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), MySQL, or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based and Packet Filtering among others. Firewall may be integrated within an web server or any other CMS components or may further reside as a separate entity.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), asynchronous JavaScript and XML (AJAX), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, Macromedia Cold Fusion, Microsoft Active Server Pages, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Alternatively, or in combination, the system, apparatus, and methods to use thereof may include a personal digital assistant ("PDA"), internet enabled wireless phone or the like. The system and apparatus may be in a home or business environment with access to a network. In an exemplary embodiment, access is through the Internet, through a commercially-available web browser software package. The host computer may provide a suitable website or other Internet-based graphical user interface which is accessible by the system and apparatus. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Oracle, MySQL, Intervase™, etc., may be used to provide database management system. The term "webpage" as it is used herein is not meant to limit the type of documents and applications that might be used to interact with the user. For example, a typical website might include, in addition to standard HTML documents, various forms, Java applets, Javascript, active server pages (ASP), AJAX (Asynchronous JavaScript and XML) applications, common gateway interface scripts (CGI), extensible markup language (XML), dynamic HTML, cascading style sheets (CSS), helper applications, plug-ins, and the like.

The users may interact with the system, apparatus, and methods to use thereof via any input device such as a keyboard, mouse, kiosk, personal digital assistant, handheld computer, cellular phone and/or the like. Similarly, the invention could be used in conjunction with any type of personal computer, network computer, workstation, minicomputer, mainframe, cellular phone, personal digital assistant (PDA), handheld computer, "smart phone" (such as, for example, a RIM™ BlackBerry™ Palm™ or Treo™) or the like running any operating system such as any version of Windows, Windows XP, Windows Vista, Windows NT, Windows 2000, Windows 98, Windows 95, Windows CE, Windows Mobile, Windows Server 2003, Palm OS, MacOS, OS/2, BeOS, Linux, UNIX Solaris or the like.

Now referring to the exemplary embodiments illustrated in FIGS. 1-5 and referring to figures herein, exemplary, but representative examples of the systems and methods of the present invention.

In one embodiment, the present invention comprises a remotely accessible integrated development environment ("IDE"), and a system for deploying applications to remote devices.

An IDE is any software and/or hardware suitably configured to allow a user to develop software. Developing software typically involves the creation of logic to access and manipulate data. The remotely accessible IDE user interface may, for example, comprise a sequence of webpages, one of which may be displayed at a single time. A page may contain page elements. Page elements are components of the page that allow a user to interact with the IDE. Examples of interaction include, for example, typing text, clicking on-screen buttons that perform automated tasks, starting a debugging or emulation environment, deploying applications to remote devices, and saving a user's work for later use or modification. Some page elements are capable of accessing other web servers and their services 8, that are accessible to the application server via a network as shown in FIG. 1. Some page elements allow access to remote databases or to local user-and application-specific databases 10, 7 that are accessible to the application server via a network. Local databases may be automatically created when being used by the application. Access to the databases may be restricted to either one user or a group of users.

In another embodiment, an IDE includes a debugging environment (alternately referred to as an emulator), which is any hardware and/or software suitably configured to remove or minimize defects. The debugging environment allows the user to test code to verify that it is free from defects. The debugging environment is capable of using application code created in the IDE and simulating code execution. In various embodiments, the debugging environment reflects the current state of the application as it is being created or modified. In various embodiments, the debugging environment simulates application execution on a remote device. In those embodiments, the properties and capabilities of the remote device is simulated in the debugging environment. During application execution, the debugging environment may access Web servers 4, databases 10, 7, and an application server 9.

A remotely accessible IDE is any IDE that a user can access and/or use remotely. Remote use is any use where a user interacts with software that is not being executed on a local device. Remote use typically occurs over a network via protocols discussed above. The logic, methods, and functions of an IDE may be stored on an application server 9. An application server 9 is any computing device that is capable of housing the logic, methods, and functions of an IDE. Any data that the IDE requires during the course of its use need not be stored on the application server, but may be stored in any suitable computer storage device that the application server may access. An example of remote use is a user employing a web browser to access an IDE across the Internet. Development is then performed by the user within the browser. Development may be done in any programming language. A common application representation may be used to refer to the applications written by the user. The web browser need not be executed on a personal computer, but could instead be executed on any device capable of running a web browser, for example a cellular phone or PDA.

Figure 3:
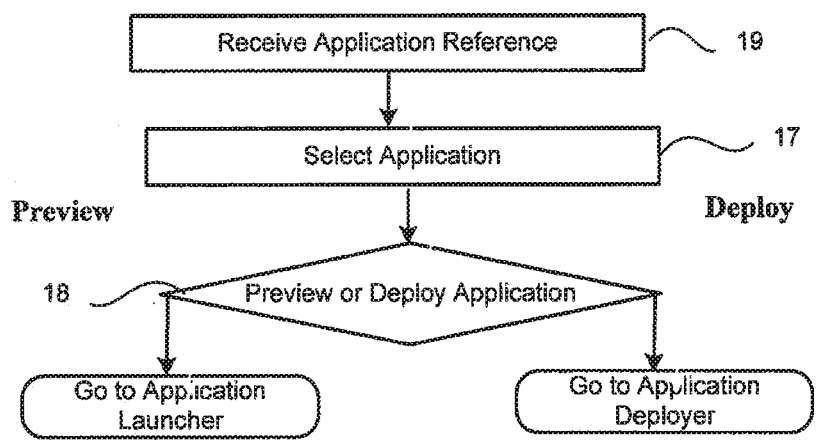
FIG. 3 is a flow diagram of an exemplary method for receiving an application reference and launching the application, in accordance with one embodiment of the present invention.

In various embodiments, the remotely accessible IDE is accessible to the user via a Web browser 20 for designing and editing applications as depicted in FIG. 3. The user interface of the remotely accessible IDE may contain a name and an informal description of the application 21. The application may be saved to, or reloaded from, the application server 23. Several methods of composition may be employed. The user interface of the remotely accessible IDE may contain controls 27 for, e.g., adding new pages, deleting existing pages, and specifying the start page. The user interface is built from a number of page elements such as, for example, elements 29 for output, input, definition of intermediate results, database manipulation, Web service access, storage local to the device, and/or flow control. A set of standard page elements may be predefined. Other page elements may be added into the running remotely accessible IDE by accessing an internal API to provide the functionality, and display the associated controls in the application designer. In embodiments that contain a debugging environment, the current state of the application and its runtime behavior may be immediately visible in the debugging environment 22, 28. In various embodiments, when the debugging environment is used in conjunction with a system for deploying applications to remote devices, the debugging environment displays a simulation of the current application for each target.

In one embodiment, the debugging environment is capable of running in two modes 24, namely design mode and run mode. In design mode, the debugging environment allows a user to click on a page element and display an editor for changing the parameters of the chosen element. In run mode, the debugging environment allows a user to interact with the application being debugged.

Figure 2:
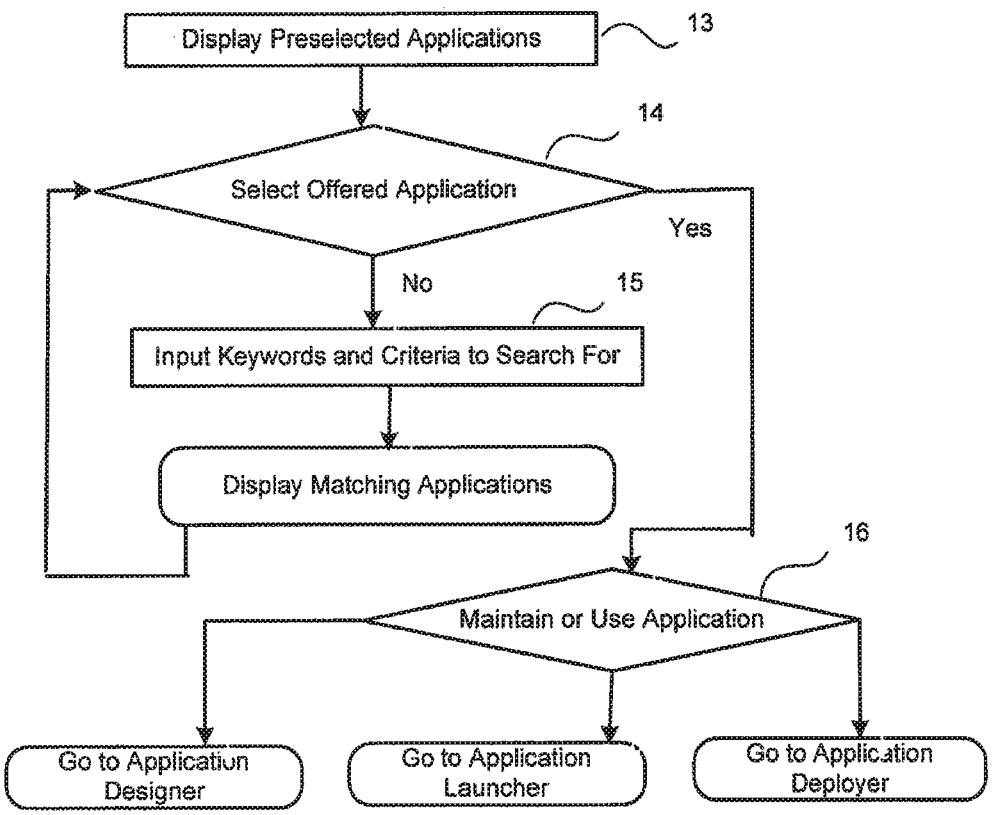
FIG. 2 is a flow diagram of an exemplary method for selecting and searching for an application, in accordance with one embodiment of the present invention.

According to various embodiments, the IDE contains a system for storing user-created applications and/or administering user groups. Applications may be stored in a server-side application repository 12. The system for storing user-created applications may be implemented with a database or operating system directory structure. The system for storing user-created applications may store applications as source code or in executed form. The system for storing user-created applications may optionally permit searching for keywords in the application title or its informal description. The system for storing user-created applications may optionally allow a pool of applications to be collected and stored. The pool of application would be provided by their authors for use by other users. The system for storing user-created applications may optionally allow users who did not originally author an application to modify it, if the original author so allows. The system for storing user-created applications may be referred to as an application retrieval system. When a user enters the application retrieval system, as depicted in FIG. 2, preselected applications may be presented 13. Applications may be selected (Step 14) by any characteristic, including for example, the most often used applications, those rated best by other users, and/or editor's choices. A user may also search for an application by using search criteria (Step 15) such as, for example, application title, application description matching given keywords, author, rating by other users, frequency of use, use of a given kind of element of the application, elements of the application accessing given Web servers or data sources, provider and/or manufacturer of application elements. The application retrieval system is capable of processing this search and displaying results as a new list of applications. A user may choose to maintain or use an application (Step 16).

The system for administering user groups may allow the creation of closed user groups and open user groups. A closed user group is a user group whose applications are not allowed to be accessed by those outside the group without authorization. The system for administering user groups may allow the creation of closed user groups. An open user group is a user group whose applications are allowed to be accessed by those outside the group without authorization. The system for administering user groups may also include other mechanisms for user creation, monitoring, and control. The system for administering user groups enhances the benefits of collaborative development. Collaboration between authors is no longer restricted to sharing source code or compiled parts of an application. Conventional systems of software development either partition applications into separate parts between authors for concurrent development or force authors to work on overlapping parts sequentially. The remotely accessible IDE, in embodiments containing a system for administering user groups, allows several authors to work on the same application on a finer level of granularity than conventional systems. Concurrent application modification is possible according to various aspects of the present invention. The results are immediately visible to all participating authors within their development environment and remote device simulators. Collaboration occurs on the level of the application as a whole and its running instance, no longer on a preliminary level like the source code level.

The Application Retrieval system stores applications in a device-independent format, the common application representation. The debugging environment runs within the Web browser. In various embodiments, the remotely accessible IDE is implemented using a technology accessible by a web browser, for example, JavaScript, Ajax, Java -Applet, Adobe Flash , or Microsoft Active-X™. The remotely accessible IDE operates on the common application representation and executes it even while the application is modified.

In various embodiments, the remotely accessible IDE may be accessed by ways other than a web browser. Application development could be performed by a either a dedicated application or a viewer application on the client side. Such a client cooperates with a server to compose, maintain, and manage the application. Examples for a dedicated application are clients written in Java™ or C++ running on a personal computer which communicate with a server using the Internet. A dedicated application may further comprises a debugging environment. A viewer application may be written in, for example, Adobe Flash™ technology and performing essentially the same tasks as the dedicated client application. In other embodiments, the remotely accessible IDE may be accessed via web browsers running on devices that are not personal computers, such as, for example, a mobile device, a gaming console and a TV set.

Figure 4:
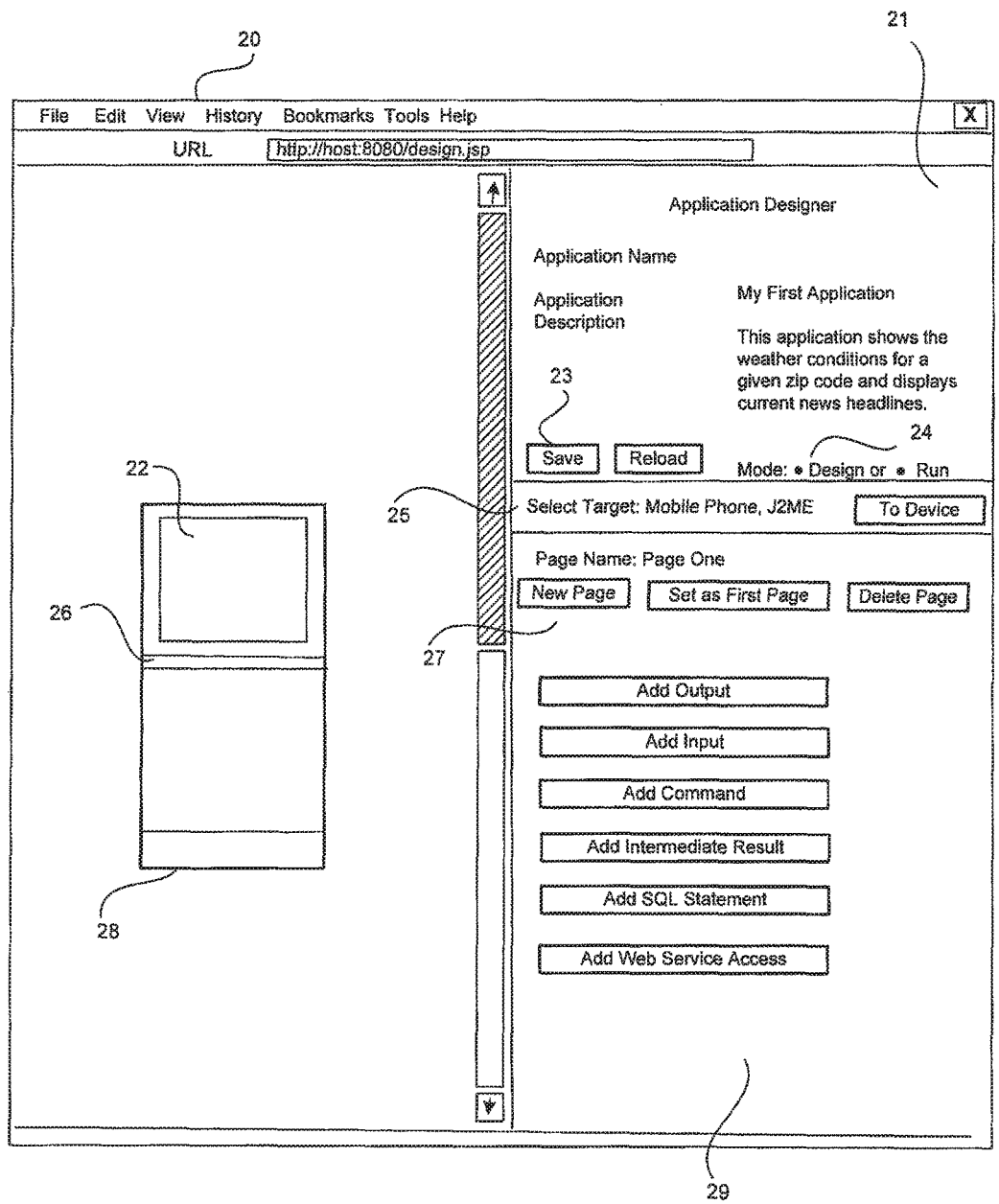
FIG. 4 is an exemplary page layout for the application design component of the system, in accordance with one embodiment of the present invention.

A system for deploying applications to remote devices may be any system that is capable of transporting an application to a remote device. In various embodiments, the system for deploying applications receives an application reference (Step 19) and the user selects an application (Step 17). The user may also preview or deploy the application (Step 18). For example, as depicted in FIG. 4, a mobile phone may be used as the remote device which is equipped with a screen for graphic application output 22 and various keys for input 28. Other remote devices may vary in screen resolution, orientation or color depth and means of input like a touch screen, a pointer device, or a numeric or alphanumeric keyboard. Like most modern mobile phones, the depicted simulator also offers customizable buttons 26. In various embodiments, at each stage of the application design, the application can be translated to and generated for the real, i.e. non-simulated, remote device by instructing the system accordingly, for example, by pressing a button 25 and downloading the application.

The deployment of the application differs for the various remote devices. As an example, for Java™-enabled mobile phones at least five possibilities are offered: The application itself or an application descriptor is downloaded by the Web browser and then transferred to the phone using a cable or wireless connection. Alternatively, a Web URL is displayed where the application can be downloaded by the phone over the air. In addition, either the application or its descriptor are sent in an MMS or SMS message to the phone. Also, a reference to the application descriptor can be sent to the phone as a WAP Service Indication Push.

Figure 5:
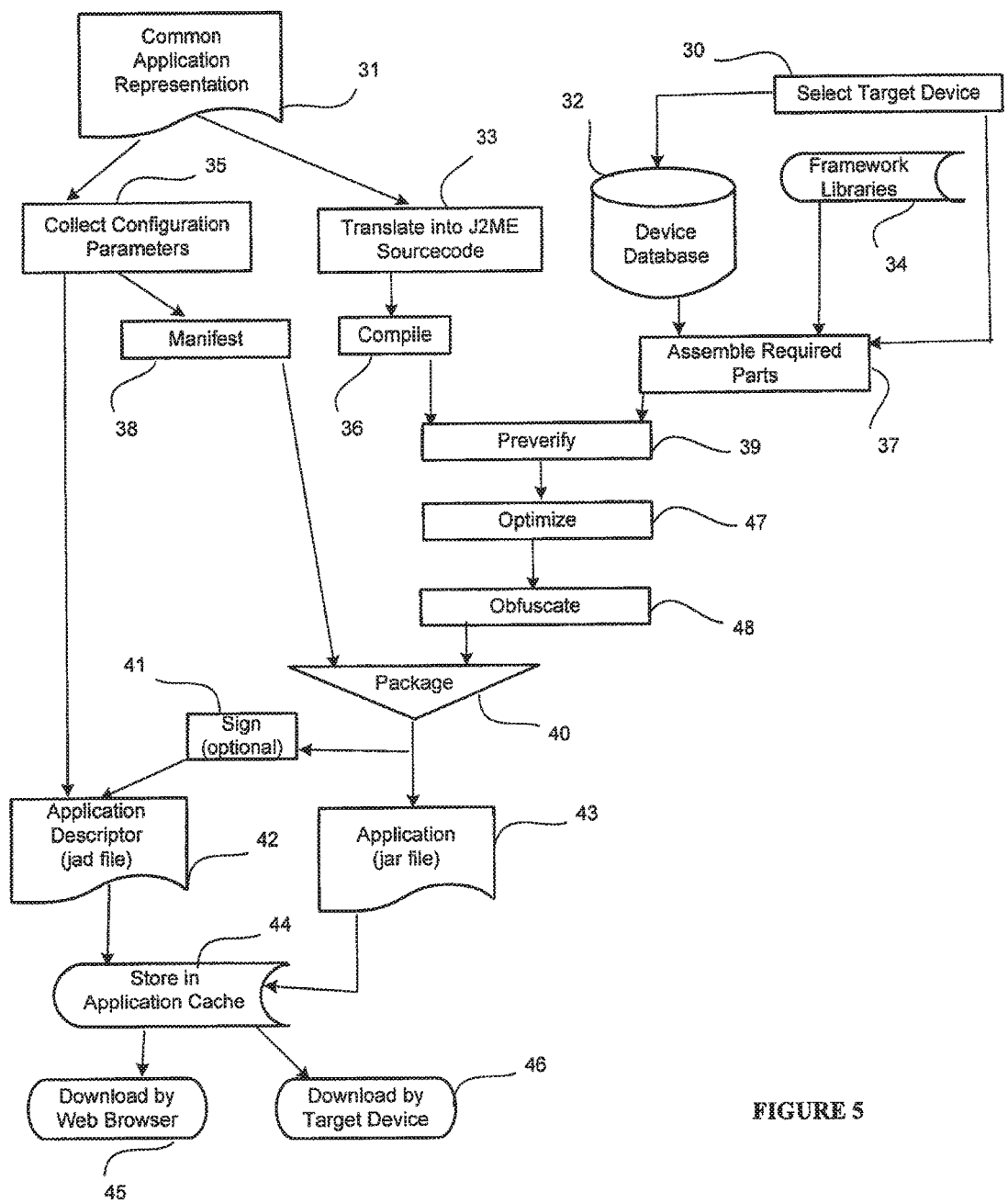
FIG. 5 is a flow diagram of an exemplary method for transforming the device-independent common application representation into a form executable by the device, in accordance with one embodiment of the present invention.

According to various aspects of the present invention in various embodiments, the remotely accessible IDE may convert applications into a format executable on a remote device. For example, a remote device may be a Java™-enabled portable device using Java™ Micro Edition (J2ME). Other remote devices and environments use an analogous scheme, for example, C-H-code for Symbian-OS-based devices or for a standalone desktop computer application. As depicted in FIG. 5, the remotely accessible IDE is capable of translating the common application representation 31 into J2ME source code (Step 33). Parts of the source code not only depend on the application but also on the selected remote device category. These dependencies are captured by the remotely accessible IDE along with other device-specific attributes in a device database 32. Device-specific and device-independent source-code is then compiled by a Java™ compiler 36 on the application server. The runtime environment and internal application programming interface is provided by a framework. The framework libraries 34 depend on the remote device capabilities. In some circumstances, remote device storage space is at a premium and the application must be kept as small as possible. For both reasons the device database also controls the selection of the required framework libraries 37. After compilation the class files are preverified (Step 39), optimized (Step 47) by various means, e.g., to eliminate not required portions of code and shortening identifiers, optionally obfuscated (Step 48) to prevent third parties from reconstructing the original source code, and, together with the manifest 38 that contains configuration-specific parameters 35, packaged (Step 40) into a target-specific application file 43. Depending on the application requirements, e.g., access to privileged functions on the device, the application may be digitally signed (Step 41). This signature, a download URL for the application, and further configuration parameters 35, e.g., a server URL or a database connection address, constitute an application descriptor file. Both descriptor and application may be stored in a cache 44 and may now be downloaded by the Web browser 45 or a remote device 46. Storage in an application cache avoids unnecessary expensive repetition of this process in case of an unchanged combination of application and selected remote device category.

In one embodiment, the system includes a Web application server including a Java™ servlet engine and an HTML page server, an SQL database, an Ajax-based client for application design, and three different methods of executing applications on a remote device named "rendering engines." In various embodiments of the present invention, many rendering engines are possible, such as, for example, for Symbian, BREW, Microsoft Windows Mobile, Adobe Flash™, Apple iPhone™, Microsoft Windows™, Linux, Apple MacOS™, Sun Microsystems JavaFX, Google Android. The three rendering engines execute an application by interpreting the common application representation on a Java™-enabled mobile phone ("dynamic engine"), by fully translating the common application representation on the server into Java™ source code and then running it on a phone ("static engine"), and by interpreting the common application representation in the Web browser using Javascript (the debugging environment).

The dynamic rendering engine offers the useful property of being able to update or even completely rewrite the application and install it on the device on the fly over the air. This can be done without any user interaction. However, for various reasons, including security reasons, the user may be asked whether he wants to update the application. Applications based on some technologies, for example, J2ME, are installed in a more complicated process which sometimes exceeds the user's ability to follow the process successfully. As the dynamic rendering engine is be able to execute potentially any arbitrary application, not only the one currently being developed, the rendering engine provides most of or the full interpretative environment, for example, the complete runtime and all libraries, regardless of the application. On the other hand, the static rendering engine may not be updated as easily but is compiled on the server and thus only contains those parts required by the application at hand. Hence, the overall application may be much smaller. For instance for a Java™-enabled mobile phone, a typical application based on the dynamic rendering engine is about 230 kB big in contrast to the same application using the static rendering engine using only about 85 kB.

According to various embodiments, a user contacts the remotely accessible IDE using his Web browser 2. The user may then choose to create an existing application or create and design a new one. If the user selects to create and design a new application, the remotely accessible IDE provides a suitable environment. Depending on the user's selection and preferences, the application may display only a portion of available page elements.

According to various embodiments, the user may select a supported remote device 1. After selecting an application or having finished creating one the application is translated into a form which the remote device is able to execute. When running the application the remote device itself accesses other Web servers 6, the databases 10, 7, and the application server 5.

According to various embodiments, an example of a full development cycle starting from the initial design to running the application on a remote device would look as follows. The user enters a URL in his Web browser. The user is presented with the choices of running various tutorials explaining different aspects of the designer tool, to import and export applications from other servers, to create a new application, and to search for existing applications.

When selecting one of the latter two choices, the designer page is loaded from the remotely accessible IDE system, such as in the form of a JSP™ page. The page contains an Ajax client running in the Web browser and comprises HTML and JavaScript. The user may name the application and optionally provide a brief textual description. An application may comprise "pages" intended to be presented on the remote device. The user may choose to create a new application page. The user may add elements to the page. In various embodiments, the remotely accessible IDE's user interface displays buttons to the user, such as, for example, "Add Output", "Add Input", "Add Command", "Add Variable", "Add SQL Statement", "Add Script", and adding custom modules. In the present embodiment, "Add Output" inserts a display field to be displayed on a remote device. A display field may comprise the playback of an audio or video clip, for example. A display field could contain static text, such as "Hello, world.", the contents of a variable, the result of a script expression, the result of an SQL statement, a Web resource which includes various content types ranging from simple text to video or audio, Web page elements selected interactively by point-and-click from another Website, and an XML request. In the present embodiment, "Add Input" allows a user to enter values, for example, a text, a file on a remote device to upload, a photo, and an audio or video clip. Such a value is then assigned to a named variable. For the user's convenience, input values can be stored persistently across invocations of an application. In the present embodiment, "Add Command" inserts an element which, when pressed by the user, switches to another application page. On a remote device, a command may be rendered as a soft button or a menu item. In the present embodiment, "Add Variable" adds and implicitly defines a named variable which may then be used in, for example, a script or expanded in other elements like an output element. Named variables can contain values of many types, for example, text, numbers, lists, associative maps, blobs, or references to those values. Those values may be stored either on the device or on server side. For instance, due to potential resource limitations on a remote device, a larger binary value, for example a blob like a video clip, is typically transferred to the server when being recorded and later referenced by the variable as a value already residing on the server.

Such a mode of processing permits the application as executed on the phone to handle variables without having to know where the referenced data itself resides, on the device or on the server or still in transit over the air. In the present embodiment, "Add SQL Statement" allows for submitting SQL statements which are executed on the server side. Typically, these statements create tables or insert data into tables whereas select-statements usually appear as output elements or as the value for a variable. In the present embodiment, "Add Script" inserts a piece of source code formulated in a language closely resembling Javascript. The choice of Javascript for the prototype was merely based on the widespread knowledge of this language. In other embodiments, any other object-oriented or procedural language will be adequate as well. In embodiments where a dynamic rendering engine is used, application scripts are parsed and interpreted on a target device at runtime.

In embodiments where a static rendering engine is used, scripts are translated into source code, for example for J2ME, at compile time on the server and included in the application. In various embodiments, the present invention allows for custom modules to be provided by third parties as plugins into the designer tool. In various embodiments, the remotely accessible IDE comprises an API that allows third parties to produce plugins. In one embodiment, a plugin for displaying and activating Google AdSense™ advertisements on the device is provided as an example. While the user is manipulating pages and elements, the results are immediately displayed within the debugging environment which concurrently runs in the same Web browser page.

In various embodiments, the user saves the application using the application retrieval system such that others may use it later. The application retrieval system may be then implicitly versioned. The application retrieval system allows the user to choose to mark the application as confidential and share it only with a limited number of other users. The application retrieval system allows the user to assign global properties, for example, whether or not to digitally sign the application for accessing privileged functionality on the device, to block advertisements, or to share the underlying SQL database with other users or to have one database per user instead.

In various embodiments, the user may select a rendering engine, for example, dynamic or static, and choose "To Device" which then creates the application for the remote device. The generation process is shown in FIG. 5. In various embodiments, the generation process is the same for both the dynamic and static rendering engine. Typically, though, fewer lines of code are generated for the same application in step 33 if the dynamic rendering engine is chosen. This is because the static rendering engine contains the complete application, i.e., source code suitable for a remote device with all pages and elements. For the dynamic rendering engine, a more sparse code is produced that consists only of a few administrative properties like name, author, and version of the application. The application itself is included in original form, i.e., as the common application representation without being translated into code directly executable by a remote device. In some embodiments, this inclusion could be spared as when running on a remote device, the generated application is able to check for the latest version and is capable of retrieving the most current version. By using the same mechanism, the system could also initially load the common application representation prior to the very first application run. This functionality, however, would require a remote device to have a working data connection to the application server when being run for the first time. In order to omit this prerequisite, the user's application is already included in the package. In various embodiments, when the user makes changes to the application and presses "To Device" for another time, devices that already have downloaded a previous version of it will recognize the change and update the application without user intervention when running the application. To save transmission cost and bandwidth the version check may be piggy-backed on other communication of the device with the server.

The inventions set forth above are subject to many modifications and changes without departing from the spirit, scope or essential characteristics thereof. Other embodiments of this invention will be obvious to those skilled in the art in view of the above disclosure. Thus, the embodiments explained above should be considered in all respect as being illustrative rather than restrictive of the scope of the inventions as defined in the appended claims.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the invention has been described as a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A method performed by a computing device, the method comprising:
   providing remote access to an integrated development environment to a first and a second users, the first and second users being remote from the integrated development environment and remote from each other in runtime environment;
   providing plugins to the first and second users, the plugins for use in developing a common application representation, wherein the common application representation comprises platform independent source code configured to execute in the integrated development environment;
   receiving an indication of a set of data from the first user, wherein the set of data comprises at least two of text data, audio data and video data;
   assigning to the set of data a variable indicative of a location of the set of data;
   receiving first and second inputs to the integrated development environment from the first and second users respectively, the first and second inputs being configured to modify the common application representation for concurrent collaboration and development of an application between the first and second users, wherein results of the first and second inputs are made concurrently visible to both the first and second users within their respective remote device simulators of the integrated development environment on receipt of the first and second inputs;
   configuring the common application representation with first platform-specific code, wherein the first platform-specific code enables the common application representation to be executed on a mobile device having a first type of operating system;
   configuring the common application representation with second platform-specific code, wherein the second platform-specific code enables the common application representation to be executed on a mobile device having a second type of operating system, the second type of operating system being different from the first type of operating system;
   compiling at least the first platform-specific code or the second platform-specific code into an operating system-specific compiled code in a specified format and at a specified time; and
   package the operating system-specific compiled code into an application file configured to be executed by at least the mobile device having the first type of operating system or the mobile device having the second type of operating system.

2. The method of claim 1, wherein the first platform-specific code is configured to interpret the common application representation on the mobile device having the first type of operating system, and the second platform-specific code is configured to interpret the common application representation on the mobile device having the second type of operating system.

3. A computing device, comprising:
   a data store comprising executable software;
   a processor in data communication with the data store, the processor configured to execute the software and cause the computing device to:
   provide remote access to an integrated development environment to a first and a second users, the first and second users being remote from the integrated development environment and remote from each other in runtime environment;
   provide plugins to the first and second users, the plugins for use in developing a common application representation, wherein the common application representation comprises platform independent source code configured to execute in the integrated development environment;
   receive an indication of a set of data from the first user, wherein the set of data comprises at least two of text data, audio data and video data;
   assign to the set of data a variable indicative of a location of the set of data;
   receive first and second inputs to the integrated development environment from the first and second users respectively, the first and second inputs being configured to modify the common application representation for concurrent collaboration and development of an application between the first and second users, wherein results of the first and second inputs are made concurrently visible to both the first and second users within their respective remote device simulators of the integrated development environment on receipt of the first and second inputs;
   configure the common application representation with first platform-specific code, wherein the first platform-specific code enables the common application representation to be executed on a mobile device having a first type of operating system;
   configure the common application representation with second platform-specific code, wherein the second platform-specific code enables the common application representation to be executed on a mobile device having a second type of operating system, the second type of operating system being different from the first type of operating system;
   compile at least the first platform-specific code or the second platform-specific code into an operating system-specific compiled code in a specified format and at a specified time; and
   package the operating system-specific compiled code into an application file configured to be executed by at least the mobile device having the first type of operating system or the mobile device having the second type of operating system.

4. The computing device of claim 3, wherein the first platform-specific code is configured to interpret the common application representation on the mobile device having the first type of operating system, and the second platform-specific code is configured to interpret the common application representation on the mobile device having the second type of operating system.

5. The computing device of claim 3, wherein each of the first type of operating system and the second type of operating system comprise at least one of: an Apple operating system, an Android operating system, a Symbian operating system, a Linux operating system, and a Microsoft Windows Operating System.

6. The computing device of claim 3, wherein the common application representation comprises a script, and the processor is further configured to cause the computing device to translate the script into source code in accordance with a selected type of operating system.

7. The computing device of claim 3, wherein the integrated development environment includes a debugging environment, and wherein the debugging environment is configured to reflect a state of a common application representation under development.

8. The computing device of claim 3, wherein the integrated development environment includes a debugging environment, and wherein the debugging environment is configured to run in a first mode, in which user interaction with the common application representation is enabled, and a second mode, in which the user may change parameters associated with an element of the common application representation.

9. The computing device of claim 3, wherein the integrated development environment is configured to simulate execution of a platform-specific application corresponding to the common application representation in at least one of the first type of operating system and the second type of operating system.

10. The computing device of claim 3, wherein the computing device is a personal computer.

11. The computing device of claim 3, wherein the executable software comprises a client application.

12. A non-transitory, computer-readable medium comprising computer-executable instructions that, when executed by a processor in a computing device comprising a data store comprising executable software, cause the computing device to perform a method, the method comprising:
providing remote access to an integrated development environment to a first and a second users, the first and second users being remote from the integrated development environment and remote from each other in runtime environment;
providing plugins to the first and second users, the plugins for use in developing a common application representation, wherein the common application representation comprises platform independent source code configured to execute in the integrated development environment;
receiving an indication of a set of data from the first user, wherein the set of data comprises at least two of text data, audio data and video data;
assigning to the set of data a variable indicative of a location of the set of data;
receiving first and second inputs to the integrated development environment from the first and second users respectively, the first and second inputs being configured to modify the common application representation for concurrent collaboration and development of an application between the first and second users, wherein results of the first and second inputs are made concurrently visible to both the first and second users within their respective remote device simulators of the integrated development environment on receipt of the first and second inputs;
configuring the common application representation with first platform-specific code, wherein the first platform-specific code enables the common application representation to be executed on a mobile device having a first type of operating system;
configuring the common application representation with second platform-specific code, wherein the second platform-specific code enables the common application representation to be executed on a mobile device having a second type of operating system, the second type of operating system being different from the first type of operating system;
compiling at least the first platform-specific code or the second platform-specific code into an operating system-specific compiled code in a specified format and at a specified time; and package the operating system-specific compiled code into an application file configured to be executed by at least the mobile device having the first type of operating system or the mobile device having the second type of operating system.

13. The computer-readable medium of claim 12, wherein the first platform-specific code is configured to interpret the common application representation on the mobile device having the first type of operating system, and the second platform-specific code is configured to interpret the common application representation on the mobile device having the second type of operating system.

14. The computer-readable medium of claim 12, wherein each of the first type of operating system and the second type of operating system comprise at least one of: an Apple operating system, an Android operating system, a Symbian operating system, a Linux operating system, and a Microsoft Windows Operating System.

15. The computer-readable medium of claim 12, wherein the common application representation comprises a script, and the processor is further configured to cause the computing device to translate the script into source code in accordance with a selected type of operating system.

16. The computer-readable medium of claim 12, wherein the integrated development environment includes a debugging environment, and wherein the debugging environment is configured to reflect a state of a common application representation under development.

17. The computer-readable medium of claim 12, wherein the integrated development environment includes a debugging environment, and wherein the debugging environment is configured to run in a first mode, in which user interaction with the common application representation is enabled, and a second mode, in which the user may change parameters associated with an element of the common application representation.

18. The computer-readable medium of claim 12, wherein the integrated development environment is configured to simulate execution of a platform-specific application corresponding to the common application representation in at least one of the first type of operating system and the second type of operating system.

19. The computer-readable medium of claim 12, wherein the computing device is a personal computer.

20. The computer-readable medium of claim 12, wherein the executable software comprises a client application.

* * * * *